US00RE35870E

United States Patent [19]

Durand

[11] E Patent Number: Re. 35,870

[45] Reissued Date of Patent: Aug. 18, 1998

[54] NORMED TRANSPORT PALLET

[75] Inventor: Michel George Durand, Moigny s/Ecole/Essone, France

[73] Assignee: Antal Trading, Ltd., Dublin, Ireland

[21] Appl. No.: 608,236

[22] Filed: Feb. 28, 1996

Related U.S. Patent Documents

Reissue of:

[64] Patent No.: 5,445,084
Issued: Aug. 29, 1995
Appl. No.: 41,113
Filed: Apr. 1, 1993

[30] Foreign Application Priority Data

Apr. 10, 1992 [CH] Switzerland ..... 01185/92

[51] Int. Cl.[6] ..... B65D 19/12

[52] U.S. Cl. ..... 108/56.3; 108/902

[58] Field of Search ..... 108/56.3, 56.1, 108/51.3, 51.1, 902; 403/349, 348

[56] References Cited

U.S. PATENT DOCUMENTS

| | | | |
|---|---|---|---|
| 1,612,302 | 12/1926 | Lehman | 108/51.1 |
| 3,602,157 | 8/1971 | Cohen | 108/51.1 |
| 3,722,430 | 3/1973 | Woodcox et al. | 108/51.1 |
| 3,835,792 | 9/1974 | Wharton . | |
| 3,868,915 | 3/1975 | Hafner . | |
| 4,133,560 | 1/1979 | Ishikawa et al. | 403/349 X |
| 4,604,014 | 8/1986 | Frano | 108/56.3 X |
| 4,829,909 | 5/1989 | Mandel . | |
| 5,094,580 | 3/1992 | Abe | 403/349 X |
| 5,191,843 | 3/1993 | Ausavich et al. | 108/56.3 |

FOREIGN PATENT DOCUMENTS

| | | | |
|---|---|---|---|
| 1159379 | 12/1983 | Canada . | |
| 0400640 | 12/1990 | European Pat. Off. . | |
| 7032039 | 4/1972 | France | 108/56.3 |
| 2110348 | 6/1972 | France . | |
| 2165939 | 8/1973 | France . | |
| 2370646 | 6/1978 | France . | |
| 1781334 | 12/1977 | Germany | 108/51.1 |
| 2733457 | 2/1979 | Germany . | |
| 8660078 | 9/1991 | Germany . | |
| 1373802 | 11/1974 | United Kingdom . | |

*Primary Examiner*—Jose V. Chen
*Attorney, Agent, or Firm*—Panitch Schwarze Jacobs & Nadel, P.C.

[57] ABSTRACT

A transport pallet includes a support surface which may be constituted by a support plate (2) or by cross-planks (20) as well as three beams (3a–3c) which are fixed beneath the support surface. The beams are fixed to the support surface by pins (5) having a latch of the bayonet type, which pins are provided to traverse the support surface as well as an upper portion of the beams before being locked by a 90° rotation. The beams are fabricated of an injected plastic material, and the pins, as well as the support surface may be made of any material including injected plastic materials. The beams may include straps (24) which permit fastening of a load (30) onto the pallet (1).

12 Claims, 4 Drawing Sheets

NORMED TRANSPORT PALLET

Matter enclosed in heavy brackets [ ] appears in the original patent but forms no part of this reissue specification; matter printed in italics indicates the additions made by reissue.

FIELD OF THE INVENTION

The present invention relates to a normed transport pallet comprising a rectangular support surface of normed dimensions and longitudinal support beams, a longitudinal dimension of which corresponding to one dimension of the support surface, which support beams are arranged beneath said support surface.

BACKGROUND OF THE INVENTION

Currently, transport pallets such as so-called europallets are used having normed dimensions such as 80 cm large and 120 cm long comprising a support surface and support beams arranged beneath said surface, the assembly being currently fabricated by nailing wooden shelves across longitudinal wooden beams.

This pallet system is relatively heavy and inflexible as far as storage and assembly are concerned and the object of the present invention is therefore to eliminate these inconveniences and to provide in particular a pallet system which comprises the following advantages:

The pallet according to the present invention should be as easy and as quickly mounted as possible, without the necessary use of any special tools.

It is a further object of the present invention to provide a pallet system which permits easy and rapid disassembly of the various components of the pallet.

Further, the various components of the pallet should be susceptible for an undetermined number of re-uses between which the pallet may be or may not be disassembled and reassembled for the next use.

Finally, the pallet system according to the present invention should provide the possibility of being stored in small space and, above all, the pallets should exhibit a considerably reduced weight compared with the traditional wooden pallets in order to permit substantial savings of transport costs, in particular for air transport, without significantly increase their cost.

To the contrary, the production cost should be as low as to justify one time use of these pallets.

SUMMARY OF THE INVENTION

According to the invention these objectives are meet by a pallet such as mentioned hereinabove, which is further characterized in that the longitudinal support beams are fabricated of injected plastic material and in that they are attached to the support surface by releasable fixation means underneath the support surface.

According to a particular embodiment of the invention, the fixation means comprise at least one opening arranged in an upper portion of the longitudinal beam, which opening permits the insertion of a latch element in order to connect the support surface with the longitudinal beams underneath.

The latch member may take the form of a pin having a bayonet type locking portion as well as a retention plate in order to engage into one of the openings of the support surface, and having an essentially cylindrical portion which extends away from the retention plate and which is provided in order to traverse the support surface through one of the openings provided therein, and which further comprises projections which extend radially away from a free end of said cylindrical portion. The opening in the upper portion of the longitudinal beam may comprise a shape having a principle portion essentially comprising to the essentially cylindrical portion of the pin and two eccentric cut-away portions in order to permit the passage of the radial projections during the insertion of the pin into the beam. The upper portion of the beam presenting said openings may take the form of a plank, the under surface of which comprising, in the proximity of said opening, a ramp portion and a groove permitting the latching of the pin after introduction and rotation of the pin into said plank.

Each beam may comprise several fixation means.

The beam may consist of two parallel planks superposed and spaced one from the other by several spacers.

The beam may comprise an inferior plank having a ridged surface, the ridges extending in longitudinal direction of the beam, in order to facilitate sliding of the beams on even ground.

The support surface may be made of a plastic material, cardboard, wood, or metal and the fixation pins may also be of plastic or of any other material.

BRIEF DESCRIPTION OF THE DRAWINGS

The present invention will now be described with reference to the drawings whereof.

DETAILED DESCRIPTION OF PREFERRED EMBODIMENTS

Figure 1:
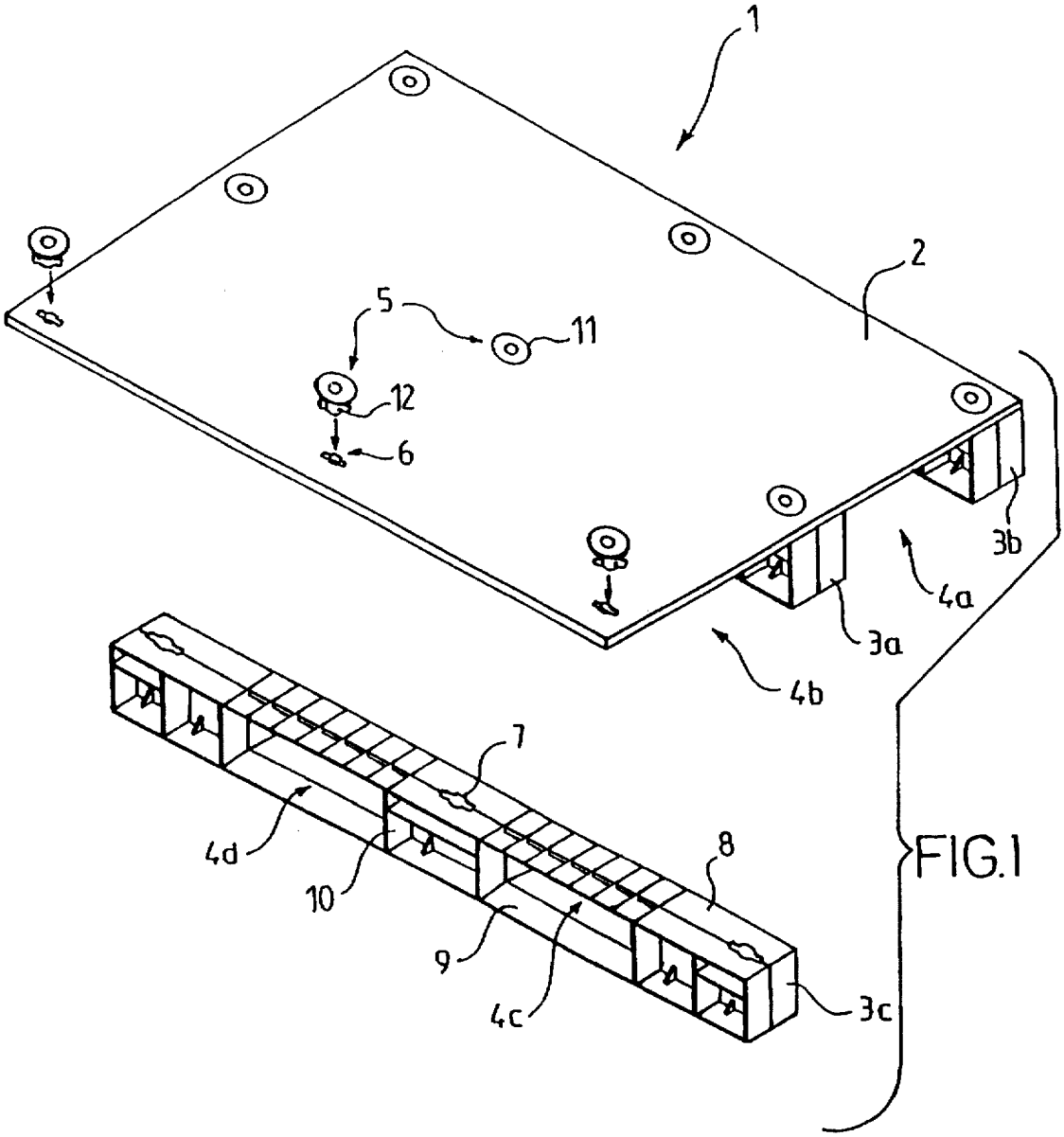
FIG. 1 illustrates a transport pallet according to the present invention in a half assembled condition.

In FIG. 1 there is illustrated a transport pallet 1 comprising a support plate 2 as well as three beams 3a, 3b and 3c. The beams are attached beneath the support plate 2 by means of a plurality of beams 5 which each comprise a retention plate 11 and a cylindrical portion 12. The beams 5 are introduced by their cyclindrical portion 12 into openings 6 of the support plate 2 until the retention plate 11 contacts the upper surface of the support plate 2.

The beams 3a, 3b and 3c comprise each an upper plank 8 comprising three openings 7 which are positioned in correspondence with openings 6 of the support plate 2 once the beam is positioned correspondingly beneath the support plate 2 in a predetermined the support plate 2 in a predetermined location.

Openings 6 and 7 comprise a geometric shape which permits the introduction of the cylindrical portion 12 of the pin, which cylindrical portion comprises two radial projections which are adapted to pass through openings 6 and 7 and the said openings have a corresponding shape to permit the passage of the pins.

Each beam further has a lower plank 9 and the two planks 8 and 9 of each beam are maintained in a predetermined distance to each other by a plurality of spacers 10.

Figure 2:
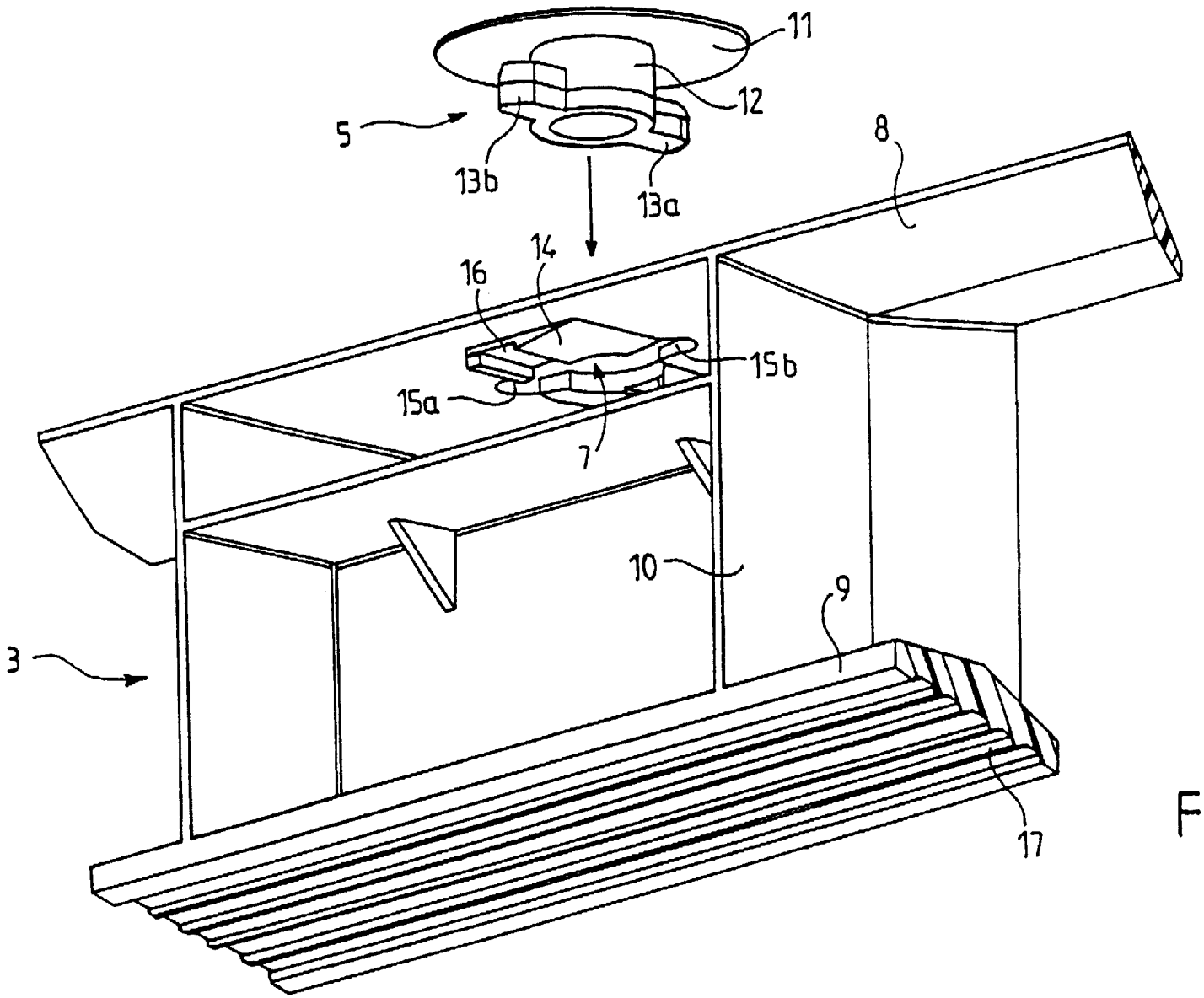
FIG. 2 illustrates a portion of the longitudinal beam showing the fixation means for the support surface and the beams.

FIG. 2 shows in more detail the fixation of pins 5 within the upper plank 8 of the beam 3 and one can see on the inferior surface of the upper plank of the beam an opening 7 which comprises a central circular portion and two cut-away portions 15a and 15b which permit the passage of the radial projections 13a and 13b of the pin 5 during the introduction of said pin into opening 7.

Once these projections have passed opening 7, the pin is submitted to a 90° rotation during which the projections 13a and 13b slide along ramps 14 and finally snapp into grooves 16 where they are essentially immobilized against the further rotation. The wall between ramp 14 and groove 16 may also be formed as ramp of inversed inclination with respect to ramp 14 in order to permit the liberation of pin 5 by forced rotation in a sense contrary to the rotation during assembly. This second ramp is particularly important if one wishes to obtain a pallet which-may-be easily disassembled.

Figure 3:
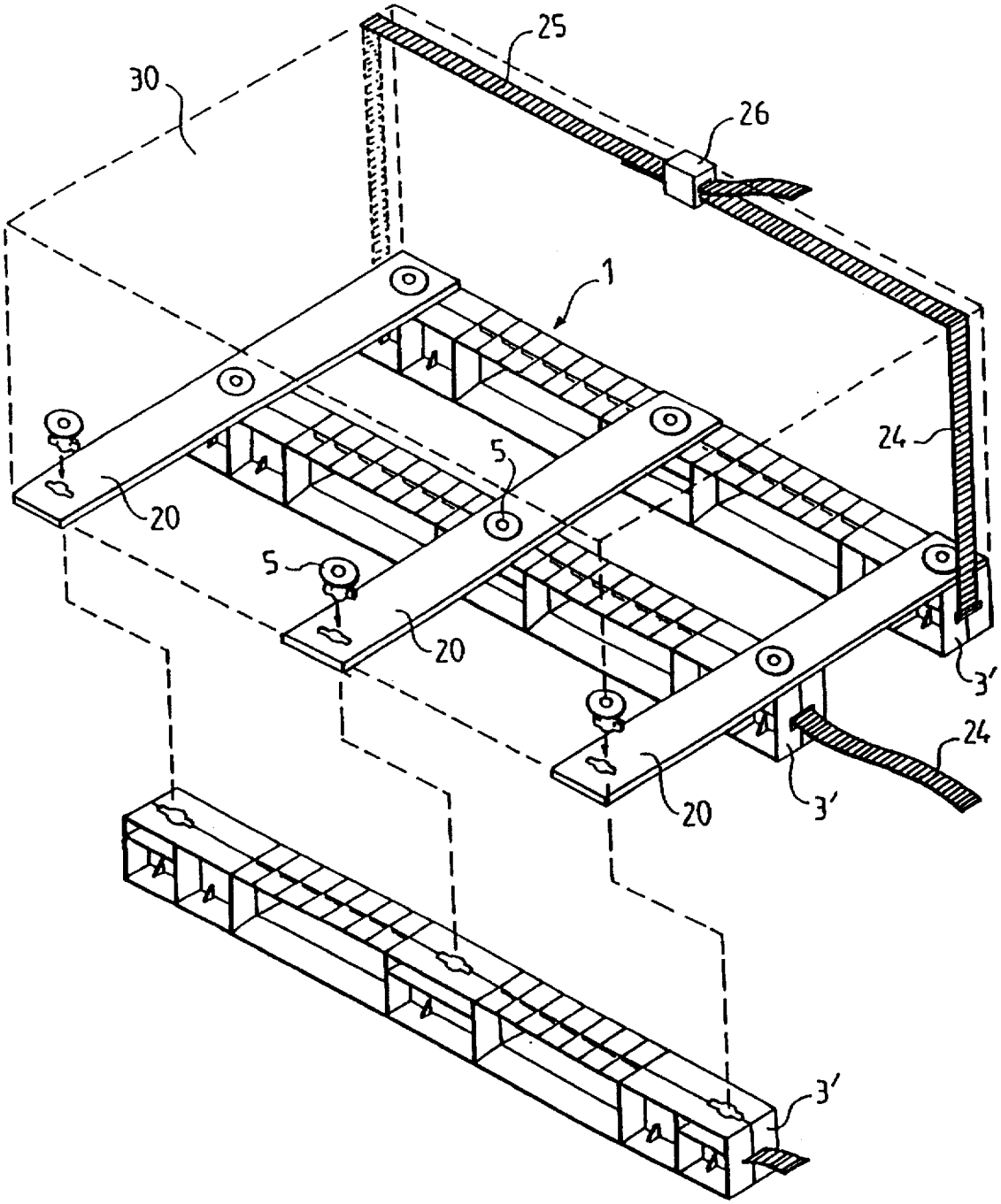
FIG. 3 illustrates another embodiment of the present invention and FIG. 4 illustrates an enlarged detail of FIG. 3.
Figure 4:
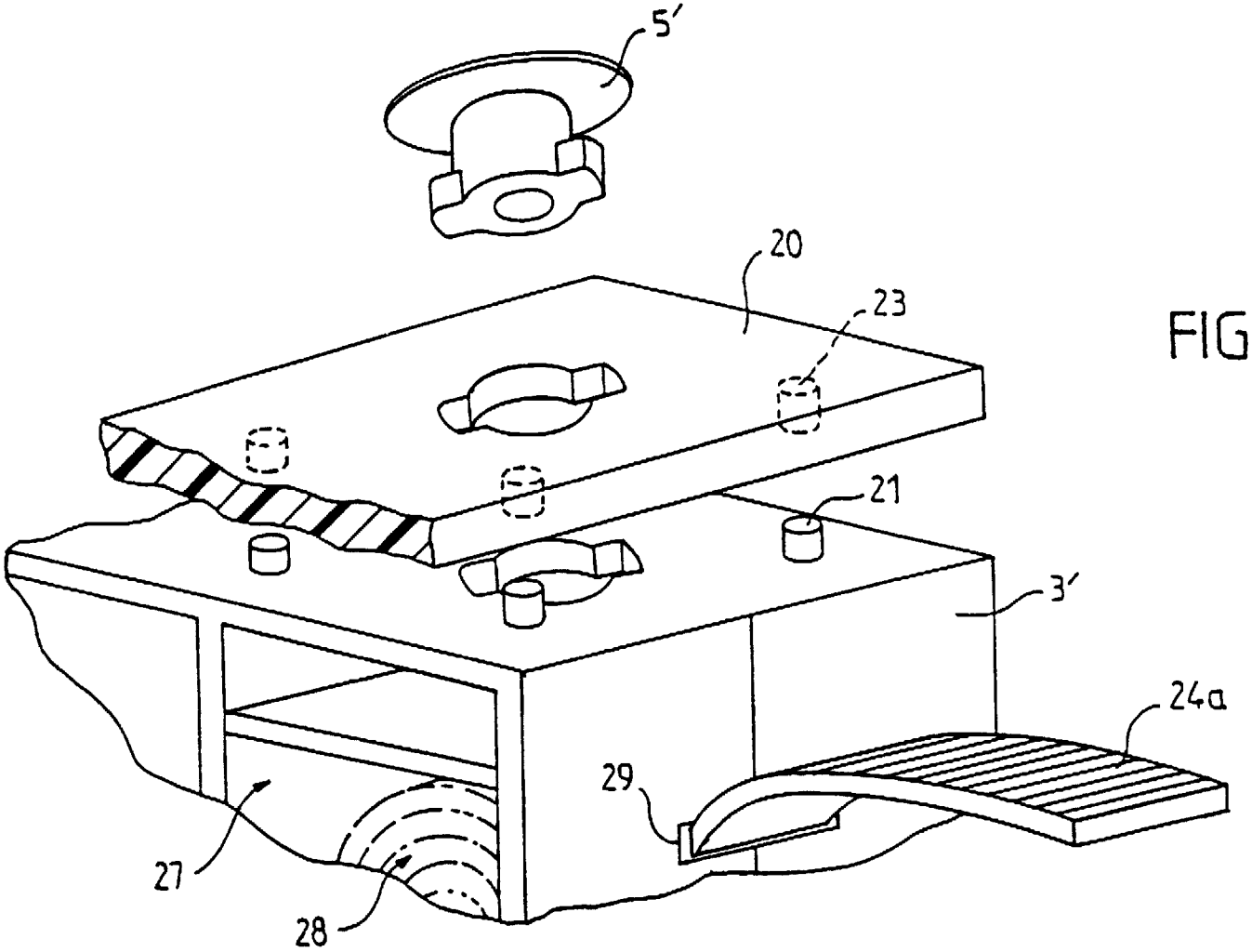

FIG. 3 shows another embodiment of the present invention wherein the pallet 1 comprises three longitudinal beams 3' and a number of cross-planks 20 which are connected each to each one of the beams by a means for rapid fixation 5', such as a pin having a 90° rotational bayonet shape as described hereinabove.

In FIG. 3, three cross-planks are illustrated, it being understood that any number of at least two cross-planks may be used, dependent on the specific use of the pallet.

Further a stabilisation means which inhibits shearing of the cross-planks 20 with respect to the longitudinal beams 3' is provided, which may be incorporated by a number of pins 22 which project either downwardly from the cross-planks 20 or upwardly from the beam 3' and which are received in borings 23 which are provided for this purpose in the opposite one of the two mentioned elements.

A stabilisation means of this type creates at least a second point of fixation at the intersection of each cross-plank with each beam in order to inhibit any pivoting movement between these two elements. The shape of these positively engaging stabilization means may be freely chosen, such as e.g. a ridge fitting in a groove.

The pallet according to the present invention may further comprise an incorporated fastening means for the load to be transported.

Such fastening means may comprise a first strap 24 having a rack-like surface as well as a second similar strap 25 and further a blocking element 26 permitting to pull at least one of said straps in one direction through a slot within said blocking element and to block relative movement of the strap in the opposite direction.

It is of course also possible to provide a solution wherein both straps are identical and the blocking element is an independent member having two slots for the passage of the two ends of the two straps. Advantageously, the two straps 24 and 25 are provided one at each end of each beam 3, 3' at locations which may be choosen according to specific requirements of the transport pallet.

The disposition of straps 24 and 25 in FIG. 3 is illustrated by way of example only. It may further be possible to fix the straps on the cross-planks 20, their disposition on the beams however seems to be more advantageous because one may form a chamber 27 within the beams in which the straps may be rolled to the coil 28, one free end 24a of which exiting from chamber 27 through an opening 29. The other end of strap 24 is blocked at the interior of chamber 27.

I claim:

1. Normed transport pallet comprising a rectangular support surface (2, 20) having normed dimensions, and longitudinal support beams (3a to 3c), a longitudinal dimension of which corresponds to one dimension of the support surface, which support beams are arranged beneath said support surface (2, 20), characterized in that said beams (3a to 3c) are fabricated from injected plastic material and in that they are attached to the support surface (2, 20) by releasable fixation means (5, 7) beneath the support surface (2, 20), said fixation means (5, 7) comprising at least one first opening (7) provided in an upper portion of each beam (3a to 3c), which opening (7) permits the insertion of a latch member (5) for latching the support surface (2) together with beams (3a to 3c), said latch member (5) comprising a pin with a bayonet means, which comprises a retention plate (11) provided to abut on a side of the support surface (2) which is turned away from the beams (3a to 3c), an essentially cylindrical portion (12) extending away from said retention plate (11) and which is provided to traverse the support surface (2) through a second opening (6) within said support surface (2, 20) and radial projections (13a to 13b) which extend radially outwardly from a free end portion of said cylindrical portion (12), and said first opening (7) having a shape essentially corresponding to the essentially cylindrical portion (12) of pin (5) and two eccentric cutaway portions (15a, 15b) which permit the passage of the projections (13a, 13b) during the insertion of the pin into each beam (3a to 3c).

2. Support pallet according to claim 1, characterized in that said support surface (2, 20) is constituted by a rectangular plate (2) or by at least two cross-planks (20).

3. Transport pallet according to claim 1, characterized in that the upper portion of the beam which includes said first opening (7) is constituted by a plank (8), a lower surface of said plank (8) comprising in the proximity of said first opening (7) a ramp (14) and a groove (16) permitting to latch said projections after introduction and rotation of said pin (5) into said plank (8).

4. Transport pallet according to claim 3, characterized in that each beam (3a–3c) comprises several fixation means (5).

5. Transport pallet according to claim 4, characterized in that the beam (3a–3c) comprises two planks (8, 9) which are parallel, superposed and spaced from each other by means of several spacers (10).

6. Transport pallet according to claim 5, characterized in that said beam (3a–3c) comprises on its lower plank (9) an inferior surface of a quality favourizing sliding in longitudinal direction of the beams.

7. Transport pallet according to claim 6, characterized in that said surface (17) favourizing sliding of the beam comprises longitudinal ridges.

8. Transport pallet according to claim 1, characterized in that the support surface (2, 20) is made of a plastic material, cardboard, wood or metal and in that said pins are made of plastic.

9. Transport pallet according to claim 1, characterized in that said support surface comprises at least two cross-planks (20) which connect the beams (3) to each other and which extend perpendicularly to said beams, each cross-plank being fixed to each beam by a fixation means (5, 7).

10. Transport pallet according to claim 9, characterized in that at each intersection between a cross-plank (20) and a beam (3) there is provided a stabilisation means comprising pins (21) which are received in borings (23), either said beams or said borings being disposed on an upper surface of the plank (8) of beam (3) and the other at the lower surface of the cross-plank (20).

11. Transport pallet according to claim 1, characterized in that at each beam and/or each cross-plank there is provided a fastening means for attachment of a load which is to be fastened to the support surface.

12. Transport pallet according to claim 11, characterized in that each beam (3, 3') comprises, as fastening means, a strap (24, 25) at each end of said beams, as well as a blocking means (26) engaging the free ends of said two straps (24, 25).

* * * * *